(12) United States Patent
Rawlings et al.

(10) Patent No.: US 6,874,744 B2
(45) Date of Patent: Apr. 5, 2005

(54) STAND FOR SUPPORTING A DISPLAY IN MULTIPLE ORIENTATIONS AND A DISPLAY USED IN COMBINATION WITH SAID STAND

(75) Inventors: Scott Rawlings, Camas, WA (US); Hideki Nishino, Saitama (JP); Konrad Pollmann, Vancouver, WA (US); David Sayler, Portland, OR (US)

(73) Assignee: Wacom Co., Ltd., Saitama-ken (JP)

( * ) Notice: Subject to any disclaimer, the term of this patent is extended or adjusted under 35 U.S.C. 154(b) by 0 days.

(21) Appl. No.: 10/080,518

(22) Filed: Feb. 25, 2002

(65) Prior Publication Data

US 2003/0160138 A1 Aug. 28, 2003

(51) Int. Cl.⁷ .............................. E04G 3/00; A47F 5/02
(52) U.S. Cl. ................. 248/292.14; 248/130; 248/922; 361/681
(58) Field of Search .............................. 248/122.1, 130, 248/176.1, 37, 292.14, 917–923, 179.1, 278.1, 176.3; 361/681, 982, 683; 16/337, 342

(56) References Cited

U.S. PATENT DOCUMENTS

| | | | |
|---|---|---|---|
| 4,564,166 A | * 1/1986 | Craft et al. ............... 248/179.1 |
| 5,215,102 A | * 6/1993 | Guirguis ..................... 600/584 |
| 5,668,570 A | 9/1997 | Ditrik |
| 5,687,939 A | * 11/1997 | Moscovitch ............. 248/122.1 |
| 5,715,138 A | 2/1998 | Choi |
| 5,812,368 A | 9/1998 | Chen et al. |
| 5,854,735 A | 12/1998 | Cheng |
| 5,923,528 A | 7/1999 | Lee |
| 5,941,493 A | 8/1999 | Cheng |
| 5,947,440 A | 9/1999 | Cho |
| 6,018,847 A | * 2/2000 | Lu .............................. 16/337 |
| 6,024,335 A | 2/2000 | Min |
| 6,047,932 A | * 4/2000 | Skvorecz .................... 248/153 |
| 6,050,535 A | 4/2000 | Kang |
| 6,061,104 A | 5/2000 | Evanicky et al. |
| 6,064,373 A | 5/2000 | Ditrik |
| 6,094,340 A | 7/2000 | Min |
| 6,189,842 B1 | 2/2001 | Bergeron Gull et al. |
| 6,189,850 B1 | * 2/2001 | Liao et al. ............. 248/292.14 |
| 6,231,021 B1 | 5/2001 | Hong |
| 6,262,885 B1 | * 7/2001 | Emma et al. ............... 361/683 |
| 6,276,655 B1 | 8/2001 | Byoun |
| 6,347,433 B1 | * 2/2002 | Novin et al. .................. 16/367 |
| 6,418,010 B1 | * 7/2002 | Sawyer ...................... 361/681 |
| 6,430,038 B1 | * 8/2002 | Helot et al. ................. 361/681 |
| 6,437,975 B1 | * 8/2002 | Huang ........................ 361/681 |
| 6,443,408 B1 | * 9/2002 | Hung ...................... 248/176.1 |
| 6,510,049 B2 | * 1/2003 | Rosen ........................ 361/681 |
| 6,532,628 B2 | * 3/2003 | Kim ............................. 16/342 |
| 6,554,238 B1 | * 4/2003 | Hibberd .................. 248/278.1 |
| 6,556,435 B1 | * 4/2003 | Helot et al. ................. 361/686 |

* cited by examiner

Primary Examiner—Lesli A. Braun
Assistant Examiner—Tan Le
(74) Attorney, Agent, or Firm—Liniak, Berenato & White, LLC

(57) ABSTRACT

An adjustable stand for rotatably and releaseably supporting a flat panel display is disclosed together with a display device usable with the stand. The display includes a boss projecting from a rear surface thereof, which boss is received in an arc-shaped channel in a plate portion of the stand. The stand further includes two hingedly connected legs and selective locking devices for controlling the angle between the legs, thereby allowing the stand hold the display in a variety of orientations with respect to a horizontal support surface.

29 Claims, 16 Drawing Sheets

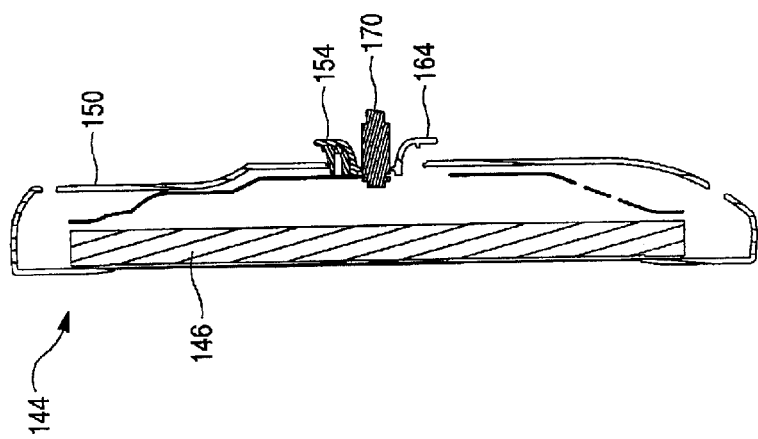
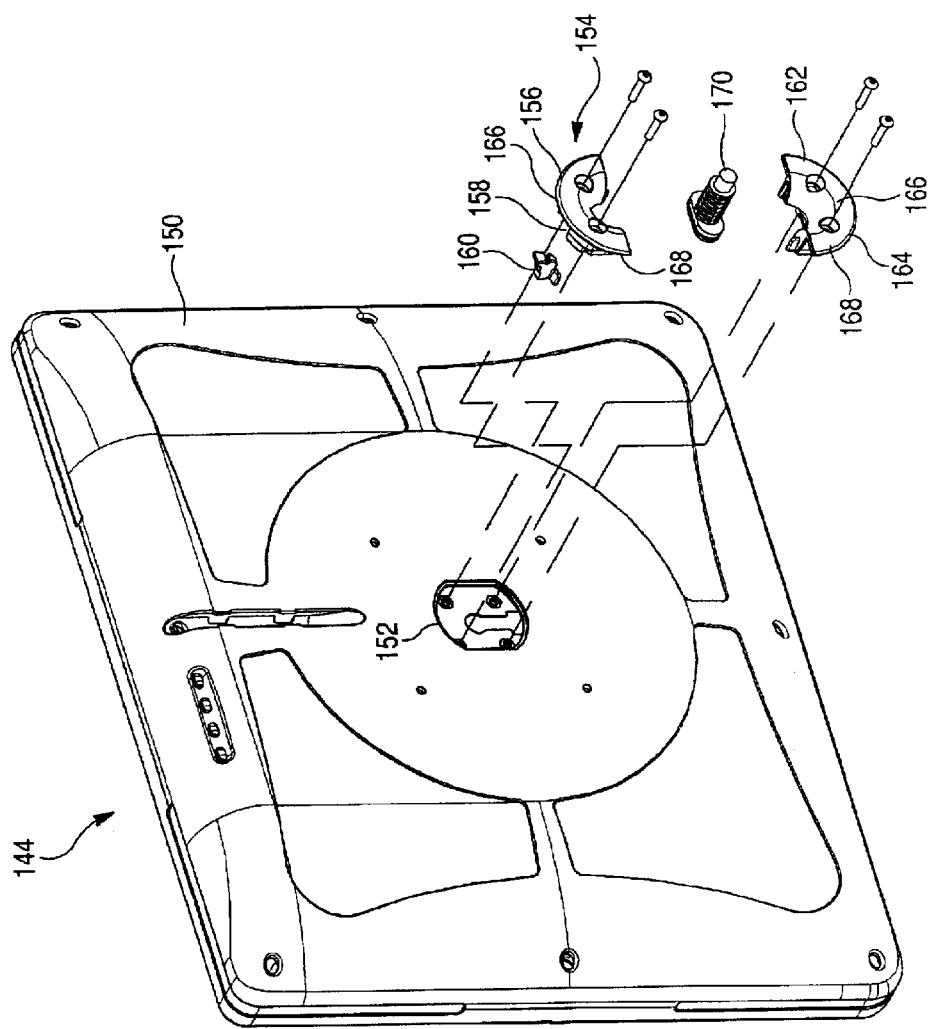

STAND FOR SUPPORTING A DISPLAY IN MULTIPLE ORIENTATIONS AND A DISPLAY USED IN COMBINATION WITH SAID STAND

FIELD OF THE INVENTION

The present invention is directed toward a stand for supporting a display and a display used in combination with the stand, and more specifically, to a pen-enabled computer display ("PED") having a screen and a stand for mounting the PED in a first orientation for using the PED primarily as a display and in a second orientation for using the PED primarily as a tablet, in a manner that also allows the PED to be removed from the stand for lap-top use.

BACKGROUND OF THE INVENTION

Flat panel displays, which may comprise, for example, liquid crystal displays ("LCD's"), are becoming increasingly common and are often used as monitors for personal computers, replacing the bulky cathode ray tube ("CRT") monitors that have heretofore been used. When used for this purpose, the displays are normally rectangular and are mounted on a user's desk in front of a keyboard with the long dimension of the rectangular panel oriented horizontally in what is commonly referred to as "landscape" orientation. Flat panel displays are thinner and lighter than CRT's and thus take up far less space on a desktop or workspace. Their light weight also allows them to be positioned more easily than CRT's, and supports are known that allow such flat panel displays to be tilted or to be rotated between a landscape orientation and a portrait orientation wherein the longer dimension of the screen is vertical. An example of a tiltable display is shown in U.S. Pat. No. 5,812,368, and an example of a rotatable displays is shown in U.S. Pat. No. 6,189,850.

Flat panels displays are also used in PED's where they are integrated with a digitizing tablet using, for example, electromagnetic resonance technology and a pen-like input device. A PED allows a computer user to move a screen cursor, click on icons, draw in an application, or otherwise interact with a computer operating system or its resident applications by means of a pen that is moved to the appropriate location on the screen. The screen cursor follows the location of the pen, and pressing the tip switch of the pen to the display or pressing a switch on the pen causes a desired action to occur. The location of the pen on or above the display screen may be determined by a number of different technologies, such as electromagnetic resonance (as in tablets made by Wacom Technology Company), resistive, capacitive or other touch-sensitive films, and other sensing technologies that are well known in the art. PED's may be connected to a separate computer unit through a wired or wireless connection, or may be integrated with a computer as in so-called Tablet PC's or hand-held Palm brand electronic organizers. When the digitizing tablet in the PED is able to detect the amount of force with which the pen is pressed against the surface of the display (e.g. by means of a tip pressure sensor in the pen, or if the touch-sensitive film is able to detect the amount of pressure applied to it with the pen tip), varying the pressure applied with the pen can affect the appearance of the image created on the screen, allowing the user to work with the PED in much the same way he works with pen and paper.

One example of a PED is available from Wacom Technology Company under the brand name "Cintiq 15X." This device includes a screen mounted in a housing and a leg projecting from the housing rear that allows the screen to be inclined at a small angle when the PED is used for drawing or at a larger angle when the device is used primarily as a display. However, the leg is not removable, making the device difficult to support on one's lap, and does not permit the screen and housing to be rotated.

For greater comfort while drawing, and to facilitate accurate curves and pencil strokes, traditional artists and animators working on paper often rotate the paper, adjust its incline on a stand, or hold it on their lap. Such users may also wish to use a PED in a similar manner or to rest the lower edge of the PED in their lap and the back side against a desk or table. Stands are known that allow a flat panel display to be rotated or tilted, but these stands usually support displays at some distance above a surface so that they can be viewed as a monitor and cannot readily be disconnected from a display to allow the display to be used apart from the stand. And, while such supports are generally adequate for supporting a flat screen in a generally vertical display orientation or in a relatively horizontal drawing mode, they do not allow a display to be removed for lap use. It would therefore be desirable to provide a stand for a display that accomplishes these objectives and that also allows the display to be rotated between landscape and portrait orientations and to be readily detached so that the display device can be used as a tablet on a person's lap.

SUMMARY OF THE INVENTION

These difficulties are addressed by the present invention which comprises a stand for supporting a display or PED at various angles of inclination with respect to a horizontal support surface, including a first range of small angles so that the PED can be used primarily as a tablet and a second range of larger angles so that the PED can serve primarily as a display. Moreover, the stand supports the PED so that it can be rotated 180 degrees or more in either direction from a starting point and so that it can be removed quickly and easily when a user wishes to use the PED or other display apart from the stand.

In a preferred embodiment, the invention comprises a display with a housing having a display screen, a boss extending from the side of the housing opposite the display screen, and a stand having a plate with a curved channel for receiving the boss and rotatably and removably supporting the display. The boss is provided with a flange on its free end, which flange is spaced away from the display housing by a distance greater than the width of the channel so that the flange prevents the boss from being pulled through the channel when the display is mounted in the stand. The plate is supported by two legs, one of which may be formed integrally with the plate, and the legs are hingedly connected by a lockable hinge. Each leg terminates in a pair of feet which support the stand and the display on a support surface. Handles or levers extend from either side of the stand to actuate the locking mechanisms of the locking hinge, which mechanisms preferably includes two oppositely mounted spring clutches. One of the levers releases the first spring clutch to allow the angle between the legs to be increased while the other releases a second spring clutch to allow the angle between the legs to be decreased. Balance springs are also provided to support the weight of the display and stand together and to prevent the stand from falling into its fully open position each time the first lever is actuated. Using these handles, the angle between the legs can be adjusted from between about 130 and 180 degrees, preferably about 140 degrees, which angle allows the display to lie flat or nearly flat on a support surface to between about 20 and 60 degrees, preferably about 45 degrees, in which configuration the stand can be used to support the device for use as a display. The boss on the display housing rests securely in the channel in the stand and the flange prevents the display from being removed from the channel in a direction normal to the screen on the display.

The boss is generally round, but may have one pair of parallel side edges connected by curved end sections as will be explained in more detail, and the channel preferably comprises an arc of more than 180 degrees with two ends separated by a first distance less than the long dimension of the boss and shorter than the distance between the two flat sides of the boss. This arrangement allows the boss to be placed in the stand in one orientation only; when the boss is rotated from this position, the long dimension of the boss cannot be removed through the channel and the display is locked in the stand. However, the display can be lifted out of the channel with little effort when it is returned to its initial orientation when one desires to use the display without the stand. Alternately, a plain circular boss could be used, but such a boss would not lock in the channel as described above. As the boss projects only a small distance from the rear of the display housing, it will not interfere with the use of the display in a user's lap.

In a second embodiment of the invention, the stand includes a boss projecting therefrom and having an end flange and a T-shaped cross section. The display includes an opening having a narrow outer portion and an wide inner portion. The flange or cross piece on the boss is received in the wide inner portion of the opening behind the narrow portion of the opening to hold the boss in place and permit rotation between the display and the support. The display can be held in various orientations to the stand by either the friction between the display housing and the stand (e.g. with a felt pad on the stand), or a friction fit between the boss and opening.

In a third embodiment of the invention, the stand includes a cradle rotatably affixed thereto into which a display can be placed. Preferably the cradle also includes at least one projecting peg that fits into a corresponding hole on the back of the display to help keep the display from sliding relative to the cradle even when the cradle is rotated. A friction fit between the cradle and the stand allows the cradle to be retained in any orientation, although other selective locking mechanisms could also be used.

In a fourth embodiment of the invention, a display is provided that includes a rotating bearing mounted on a rear surface thereof. The rotatable bearing is mountable to fixed supports such as pegs projecting from a support stand and held securely thereto by those pegs thereby allowing the display to rotate relative to the bearing and the stand.

It is therefore a principal object of the present invention to provide a stand for supporting a display in a variety of different orientations.

It is another object of the invention to provide a flat panel display that can be used alone or mounted in an adjustable stand.

It is a further object of the invention to provide a stand for rotatably supporting a flat panel display in a manner that allows for the quick and easy removal of the display from the stand.

It is still another object of the invention to provide a stand having a flat front surface for supporting a display that can be selectively locked to hold the flat front surface at a number of different inclination angles with respect to an essentially horizontal desktop surface.

It is yet another object of the invention to provide a stand that can be positioned in a first orientation for allowing a device mounted thereon to be used as a tablet and in a second orientation for allowing a device mounted thereon to be used as a display, and allowing the device, in either orientation, to be rotated.

It is still a further object of the invention to provide an adjustable stand having a bearing for rotatably supporting a display.

It is yet a further object of the invention to provide an adjustable stand including a rotatable cradle for releaseably and rotatably securing a display to the stand.

In furtherance of these objects, a display stand is provided for rotatably supporting an object having a rear surface and a boss extending from the rear surface which stand comprises a front member comprising a C-shaped plate member having a convex first end and a concave second end and a first generally T-shaped support depending from the first end and a second member comprising a generally T-shaped support connected to the first member by a hinge.

A combination of a display and a stand for the display is also provided wherein the display comprises a housing having a boss projecting therefrom and the stand comprises first and second hingedly connected supports and also has a channel in which the boss is removably and rotatably received. The first and second supports are selectively lockable in at least two positions.

Also provided is a combination of a digitizer having a display screen and a stand for supporting the digitizer on a surface where the digitizer includes a housing having a boss and the stand comprises first and second hingedly connected supports and a channel in which the boss is removably and rotatably received. The first and second supports are selectively lockable in a first position for holding the digitizer at a first angle and a second position for holding the digitizer at a second angle.

A further aspect of the invention comprises a method of mounting a PED on a stand comprising the steps of providing a PED including a housing having a boss projecting therefrom and a stand comprising first and second hingedly connected supports lockable in at least a first position and a second position, the first support including a channel, and first and second walls extending from the channel and angled toward one another. The boss of the PED is slid into the channel and then the first and second supports are placed in either the first or second position.

Another aspect of the invention comprises a PED adapted to be supported by a user's lap or mounted in a stand in a first position for use as a writing tablet or in a second position for use as a display. This PED includes a housing, a display screen mounted in the housing and a boss projecting from a first side of the housing, where the boss has a flange dimensioned to support the weight of the digitizer when the PED is mounted in a stand.

Also provided is a combination of a display and a support stand for adjustably supporting the display, where the display comprises a housing having a front and a rear and a screen mounted on the housing front. A boss projects from the housing rear and including a centerline normal to the display and a generally circular cross section normal to the centerline, a first end adjacent the housing and a second end spaced from the housing and having a flange. The stand includes a plate member having a thickness, a bearing surface comprising a greater-than-180-degree arc of a circle located in the plate member and having first and second ends and first and second walls extending from the first and second ends. The bearing surface receives the boss and removably and rotatably supports the display for rotation between a portrait orientation and a landscape orientation. The stand also includes a first leg comprising the plate member and a second leg connected to the first leg by a selectively lockable hinge including a spring clutch and a balance spring. The first leg lies generally in a first plane and the second leg lies generally in a second plane and the first and second legs are shiftable between a first position wherein the first leg and the second leg meet at an obtuse angle and a second position wherein the first leg and the second leg meet at an acute angle. Furthermore, the first and second legs each include a free end spaced from the hinge. The display and stand together have a center of gravity above and between the free ends when the display is supported on the stand, and the stand includes at least one lever for shifting the spring clutch between an engaged position and a disengaged position.

Also provided is a combination of a display and a support stand for adjustably supporting the display where the display comprises a housing having a front and a rear and a screen mounted on the housing front. One of the housing and the stand includes a bearing member and the other includes a receiver, the receiver removably and rotatably receiving the bearing member and supporting the housing.

A further aspect of the invention comprises a stand for rotatably and releaseably supporting a display comprising a base and a support mechanism for rotatably supporting and releaseably securing a display on the base.

Another aspect of the invention comprises a combination of a display and a stand for adjustably holding the display where the display has a housing with a front and a rear and a screen mounted on the housing front. A rotatable bearing member is mounted on either the display or the stand and a support is mounted on the other one of the display and the stand for removably supporting the bearing member and the housing.

BRIEF DESCRIPTION OF THE DRAWINGS

These and other objects and advantages of the invention will be better understood after a reading and understanding of the detailed description of the invention that follows together with the following drawings.

FIG. 12 is a partially exploded view of the rear of the display of FIG. 11 and a boss for connecting the display to the stand.

FIG. 13 is a sectional side elevational view of the display of FIG. 12.

DETAILED DESCRIPTION OF THE INVENTION

Figure 1:
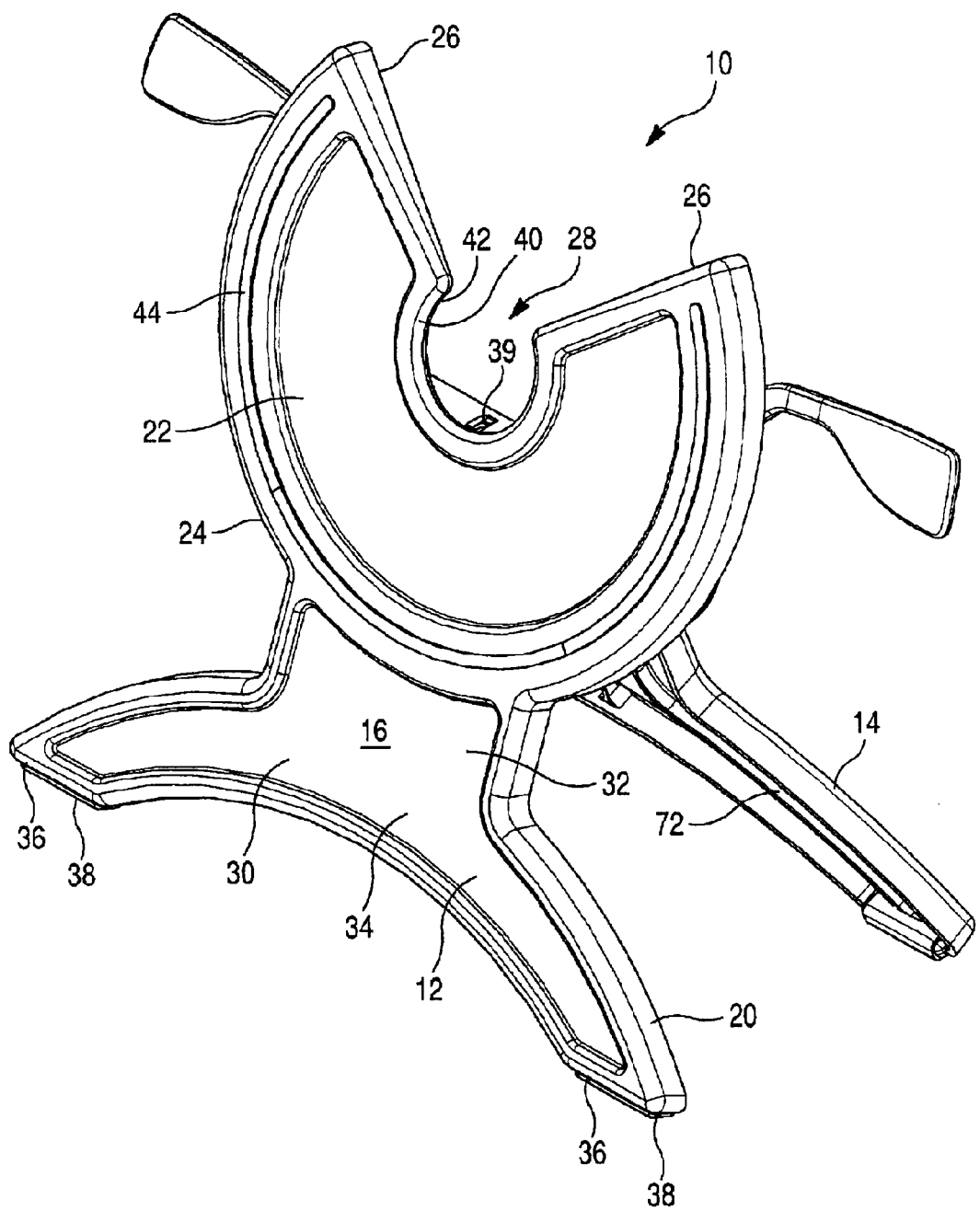
FIG. 1 is a front perspective view of a support stand according to the present invention including a front leg and a rear leg connected by a hinge.
Figure 2:
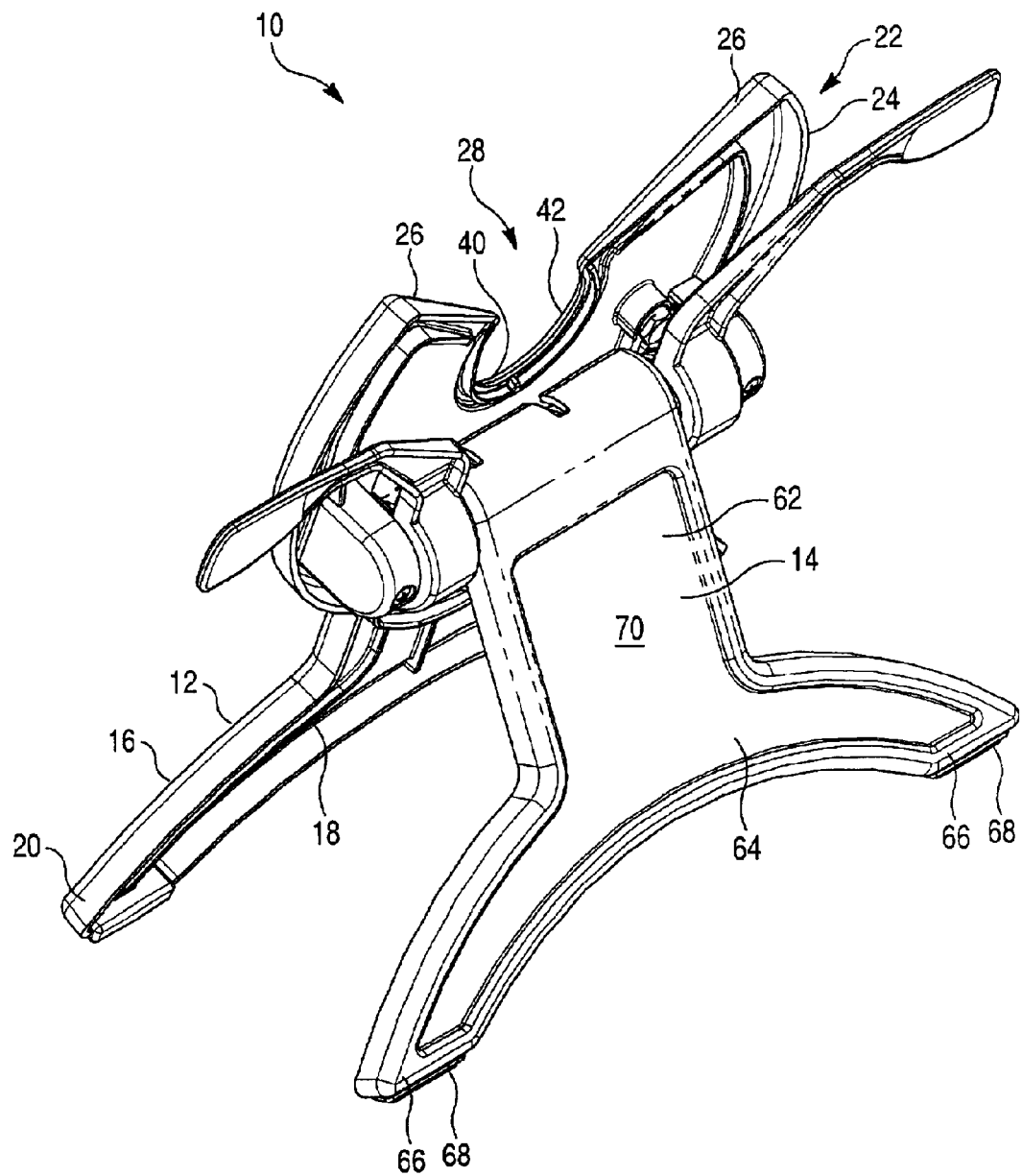
FIG. 2 is a rear perspective view of the support stand of FIG. 1.

Referring now to the drawings, wherein the showings are for purposes of illustrating a preferred embodiment of the invention only and not for the purpose of limiting same, FIGS. 1 and 2 show a stand 10 including a front leg 12 and a rear leg 14, front leg 12 comprising an outer side 16, an inner side 18, and a sidewall 20 that defines the periphery of inner side 18. As used herein, the inner side of a leg is the part that faces toward the other leg when the device is assembled. The front and rear legs are preferably formed from aluminum or another light-weight metal, but other materials, such as various thermoplastics could also be used. Front side 12 includes a C-shaped upper plate portion 22 having a curved outer peripheral portion 24, linear peripheral portions 26 extending inwardly from the outer peripheral portion, and a channel 28 connecting the linear peripheral portions 26, and an integrally formed, generally T-shaped foot portion 30 having a stem 32 connected to the outer peripheral portion 24 and a curved base 34 with terminal foot portions 36 covered with a non-slip material 38 such as rubber. A rotation limiting stop 39 is located at the midpoint of channel 28. The portion of sidewall 20 adjacent channel 28 forms a bearing surface 40. Linear peripheral portions 26 angle inwardly toward channel 28 and also in the direction of base 30. Outer side 16 is also provided with an arc-shaped length of felt 44 spaced inwardly from and generally corresponding to the curvature of curved peripheral portion 24 which felt provides a smooth surface for a display mounted on the stand to rotate against. Of course, the felt does not have to be arranged in an arc, and other arrangements would also provide for smooth movement of the PED over the front side of the stand.

Figure 3:
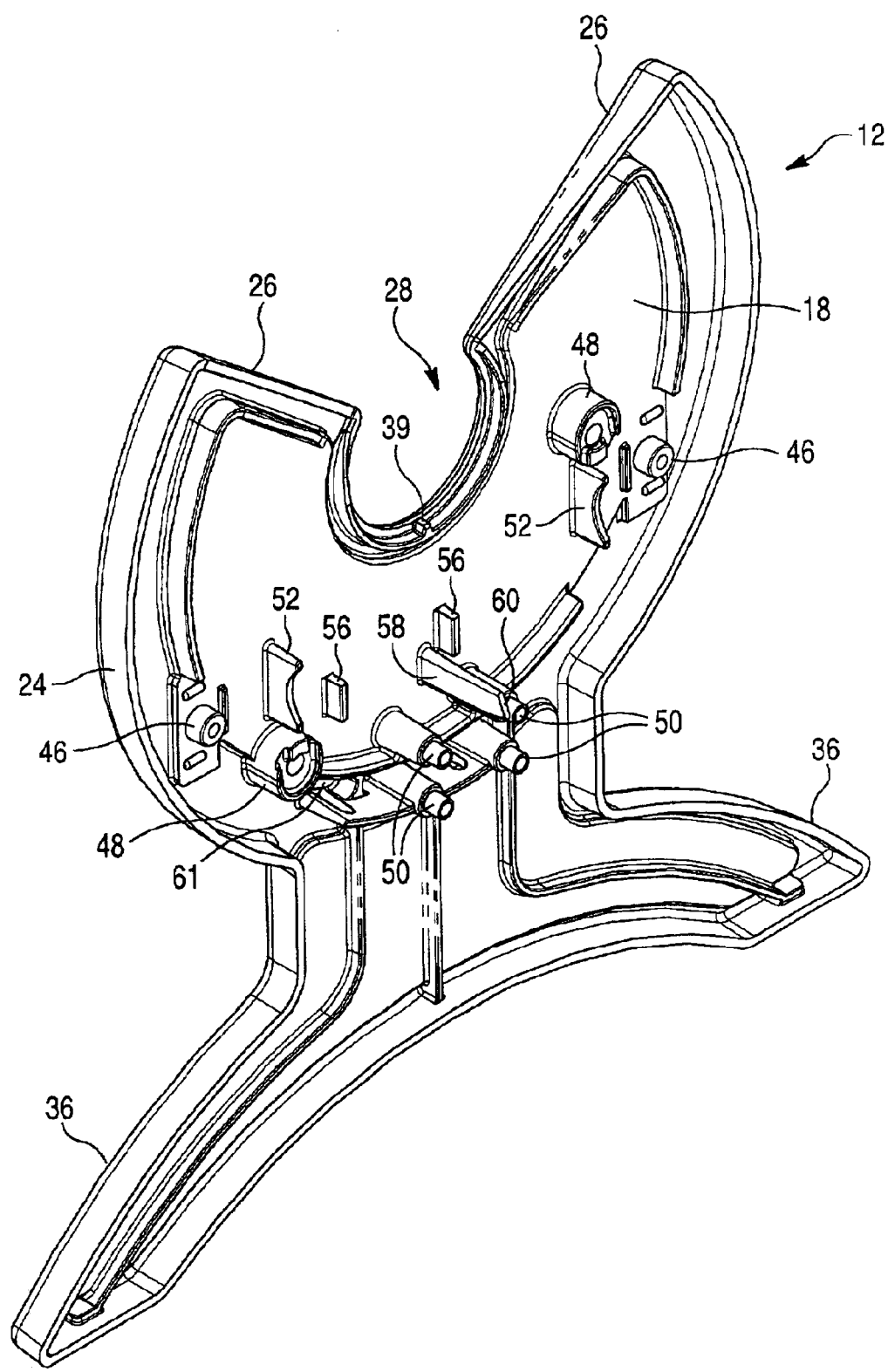
FIG. 3 is a rear perspective view of the front leg of the support stand of FIG. 1.

As shown in FIG. 3, inner side 18 includes a plurality of bosses each including an opening for receiving bolts, screws or other fasteners that will be described in detail hereinafter. These bosses include, moving inwardly from the peripheral edge of the inner side, first and second bearing support bosses 46, first and second clutch spring attachment bosses 48 located inwardly from the bearing support bosses and at different distances from foot 30, and first and second pairs of lever support bosses 50. First and second planar projections 52 having arcuate outer faces are mounted adjacent clutch spring support bosses 48, a pair of opening limiting stops 56 is disposed generally between the planar projections 52 and a closing limiting stop 58 is also present which projects outwardly a greater distance than the previously listed projections and terminates in a surface 60 angled at about 20 degrees with respect to inner side 18. In addition, two balance spring attachment openings 61 are integrated in the curved middle wall that completes the arc of 24 from the right and left.

Figure 4:
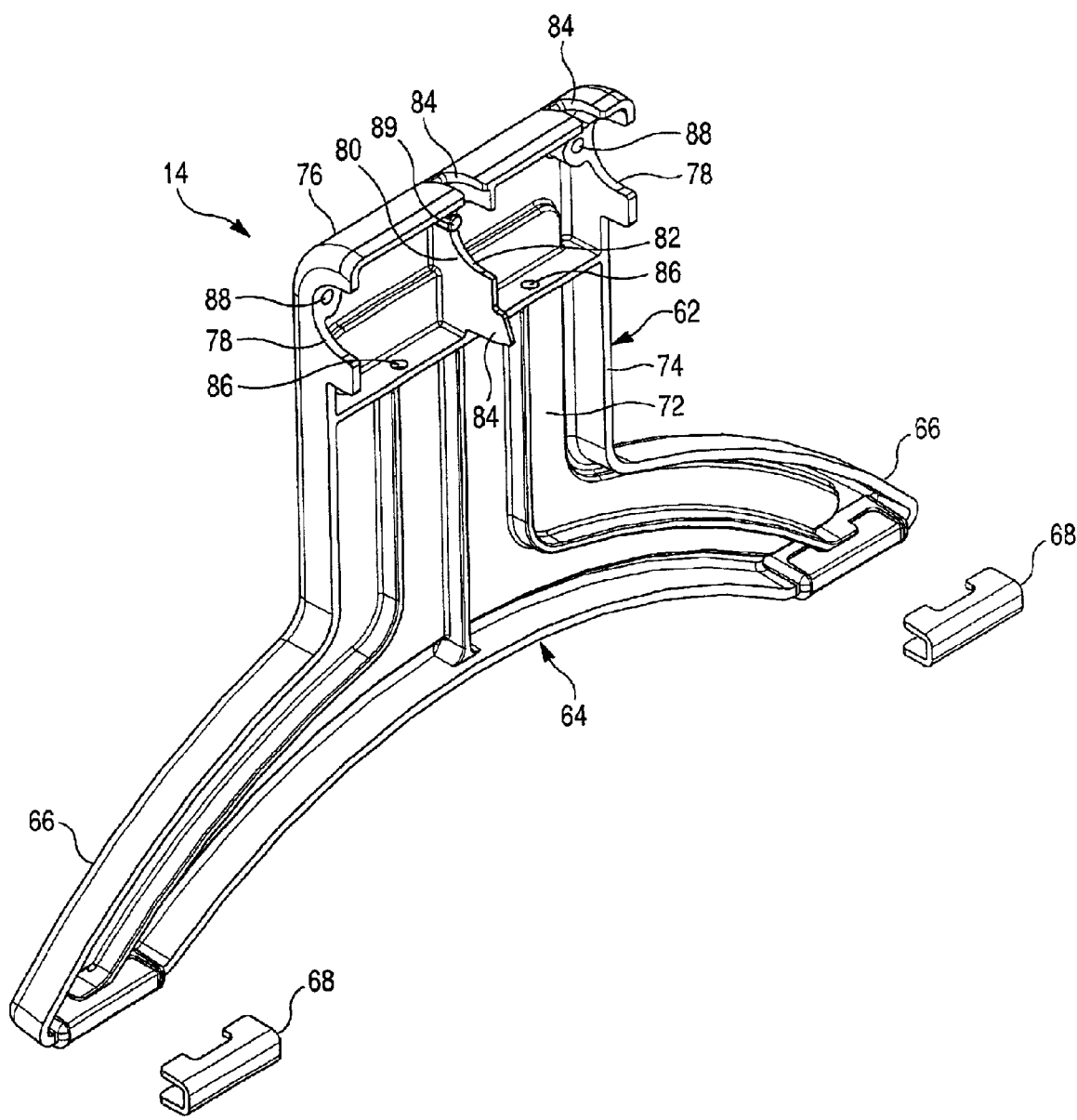
FIG. 4 is a rear perspective view of the rear leg of the support stand of FIG. 1.

With reference to FIGS. 2 and 4, rear leg 14 is generally T-shaped and includes a body portion 62 and a curved base 64 terminating in a pair of foot portions 66, which body, base and foot portions are generally similar to T-shaped foot 30 of front leg 12. Low friction foot coverings 68 are attached to each foot, which coverings are preferably made from felt. Rear leg 14 includes an outer side 70, an inner side 72 and a sidewall 74 extending from the periphery of inner side 72. The top portion 76 of outer side 70 is curved or rounded over, and the sidewalls near top portion 76 includes a pair of C-shaped notches 78. A plate 80 extends from inner side 72 between the sidewalls and includes a C-shaped notch 82 aligned with C-shaped notches 78 and a projection 84 for cooperating with closing limiting stop 58 on front Leg 12 when the stand is assembled. To portion 76 further includes first and second notches 85 for cooperating with opening limiting stops 56 on front leg 12 when stand is assembled, while balance spring attachment openings 86 are provided adjacent C-shaped notches 78 and hinge attachment openings 88 beneath top portion 76. A peg-like protrusion 89 on the C-shaped notch 82 is helpful for the assembly and pre-preloading of the balance springs.

Figure 5:
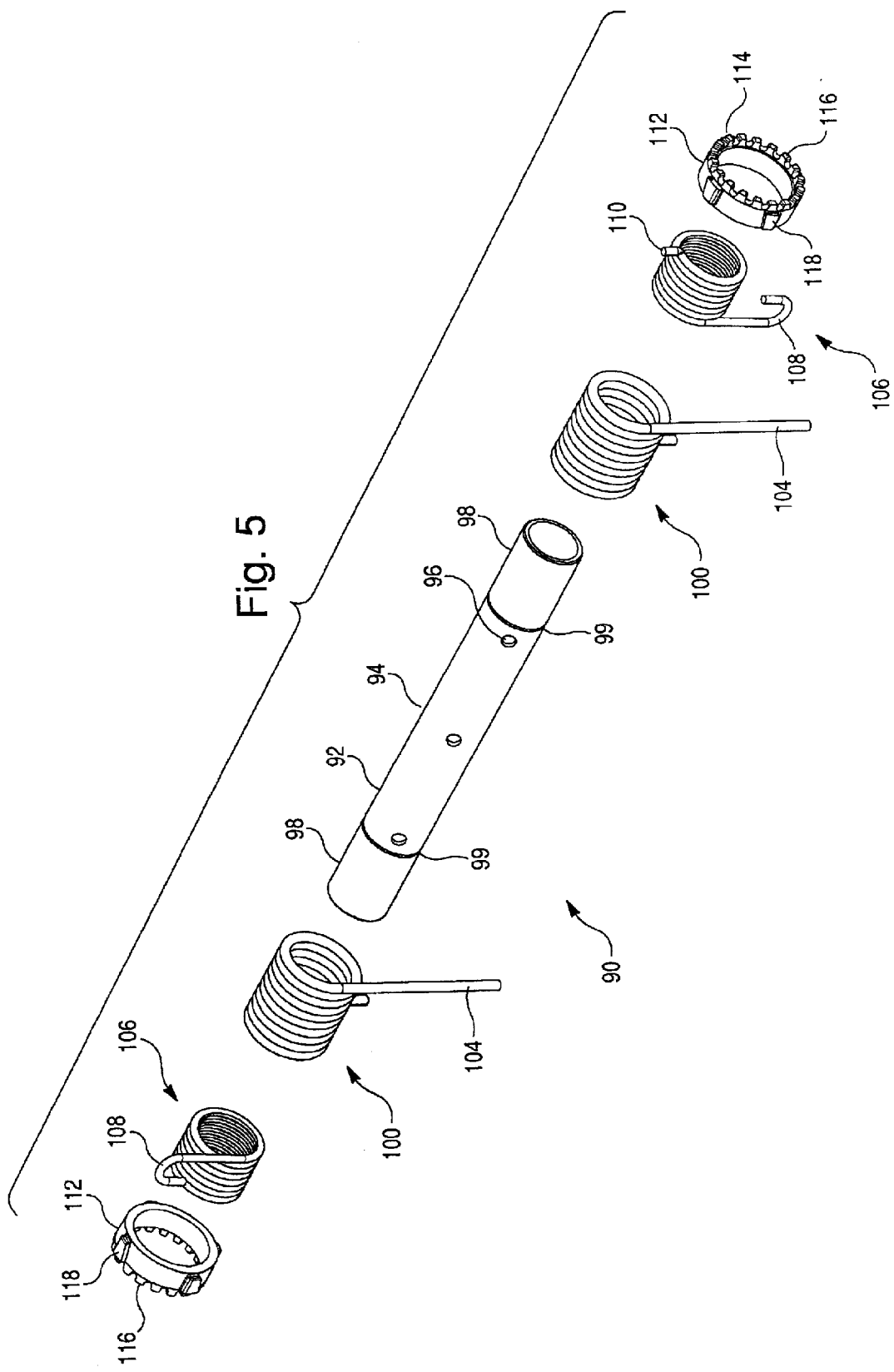
FIG. 5 is an exploded view of a hinge mechanism for use with the stand of FIG. 1 which hinge includes two spring clutches and two balance springs.
Figure 6:
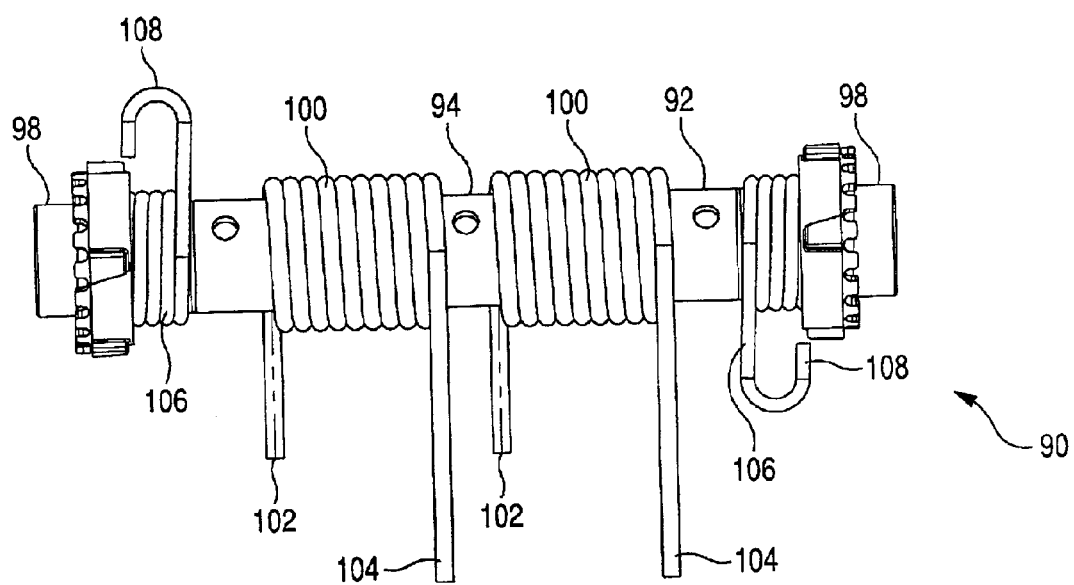
FIG. 6 is a front elevational view of the hinge mechanism of FIG. 5.

FIGS. 5 and 6 show a hinge mechanism 90 comprising a cylindrical rod 92 having a central portion 94 with a plurality of bores 96 extending across the diameter of the rod and end portions 98 separated from central portion 94 by shallow grooves 99. Two balance springs 100 are mounted on the central portion of the rod, each of the springs including a rear leg end 102 and a front leg end 104 and, furthermore, first and second lock springs 106 are mounted on the end portions 98. The inner diameter of the coiled lock springs is about equal to the outer diameter of the end portions 98 which allows for an interference fit between the lock springs and the rods. Each lock spring 106 includes a hooked fixed end 108 and a free end 110 angled at 90 degrees to the surface of the coil spring. The lock springs 106 are mounted on the sleeve with their free ends 110 closer to the ends of the rod 92 than the fixed hooked ends. A lock spring sleeve 112 including a projecting flange 114 having eighteen edge notches 116 spaced about the periphery thereof at 20 degree intervals is also provided. The outer surface of the lock spring sleeve is provided with four projections 118, three of which are spaced at 95 degree intervals from the respective previous one. The lock spring sleeve fits over the lock spring with a slight interference fit.

Figure 7:
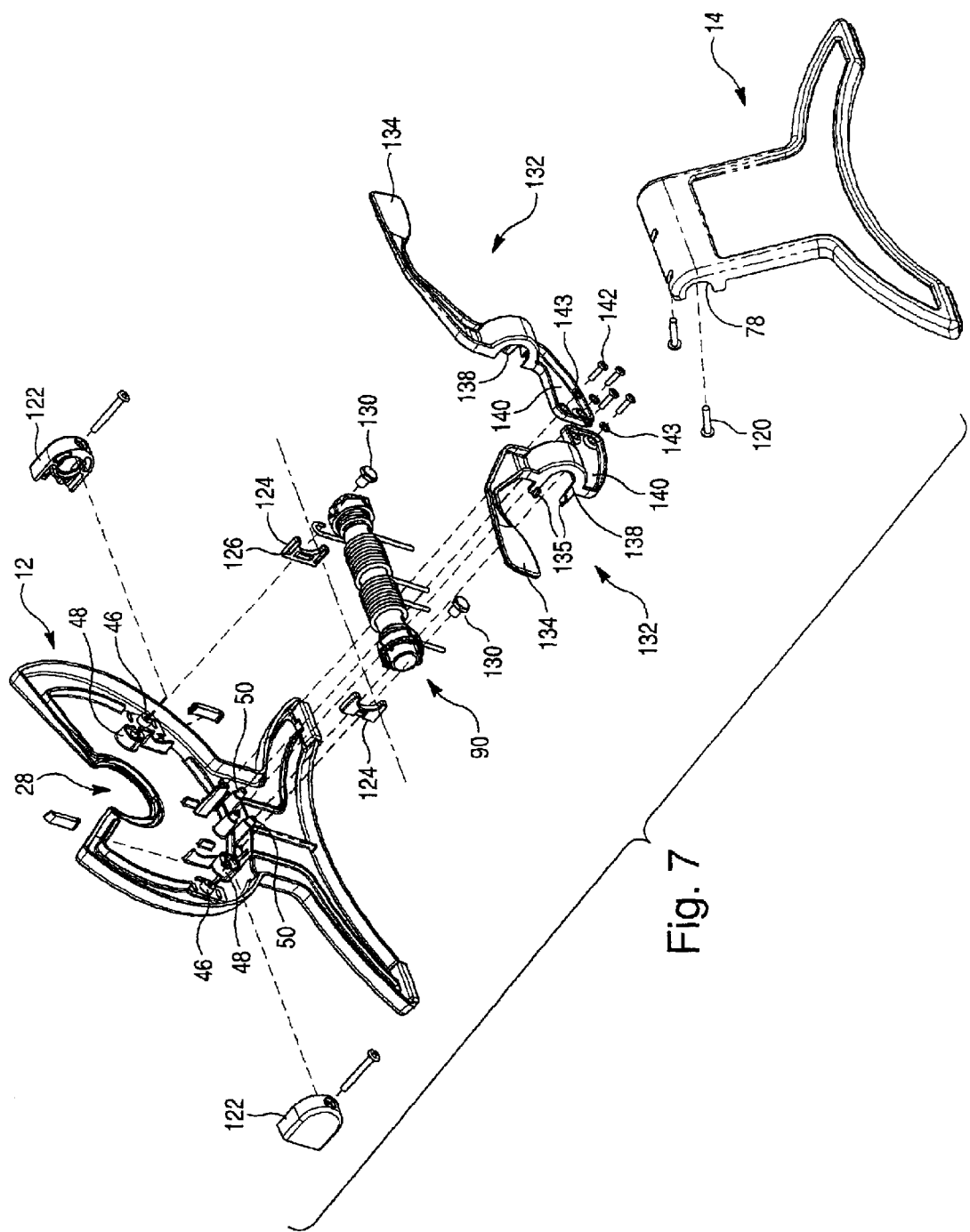
FIG. 7 is an exploded view of the stand of FIG. 1.

The assembly of stand 10 will now be described with particular reference to FIG. 7. Balance springs 100 are placed over central portion 94 of rod 92 so that they are located between bores 96, and lock springs 106 are thereafter slid over end portions 98 of the rod. The lock springs are helical torsion springs, and the diameter of the spring coil can be increased by pulling the ends of the spring apart in an uncoiling direction and decreased by pressing the ends together in a coiling direction. To fit the lock springs on the rod, the ends are pulled apart so the spring will be large enough to fit over the rod, the spring is slid over the end of the rod and the ends are then released to provide a friction fit between the spring and rod. Lock spring sleeves 112 are slid over the lock springs so that free end 110 of the spring is received in one of the eighteen notches in the sleeve flange 114. Projections 118 will be acted upon by a pawl to be described hereinafter.

The combination of and the angular relationship between the notches and the projections allow the angular relationship between the pawl and the free end 110 of the spring to be set in increments of 5 degrees. Thus, for example, if a first one of the projections is aligned with one of the edge notches, the end of the lock spring can be placed in that notch and be offset from the projection by 0 degrees, or into adjacent notches and be offset by 20 degrees, 40 degrees, etc. An adjacent one of the projections will be offset from an adjacent notch by 5 degrees, and therefore, the offset between the projection and the free end of the spring placed into that notch will be 5 degrees, or if placed into adjacent notches, be offset by 25 degrees, 45 degrees, etc, depending on which of the notches is used. The placement of the lock spring sleeve will depend on the exact relative position of the legs of the lock spring used, and, because the sleeve slides on and off the lock spring, it can easily be adjusted later in the assembly process to ensure a proper relation between the actuating levers and the spring.

Next, hinge 90 is place onto support surfaces of 52 and the front legs 104 of the balance springs 100 are threaded into the balance spring support openings 61 in the back of front leg 12. The rounded legs 108 of the locking springs 106 are attached to bosses 48 with appropriate screws. At this point, the relationship between the short leg 110 of the locking springs 106 and the rear surface 18 can be determined, and based on the required relationship between the rear surface 18 and the projections 118, the lock sleeve can be adjusted as necessary to leave the projections in the proper position relative to the rear surface 18 and the pawl 138 that will be acting on them.

Figure 8:
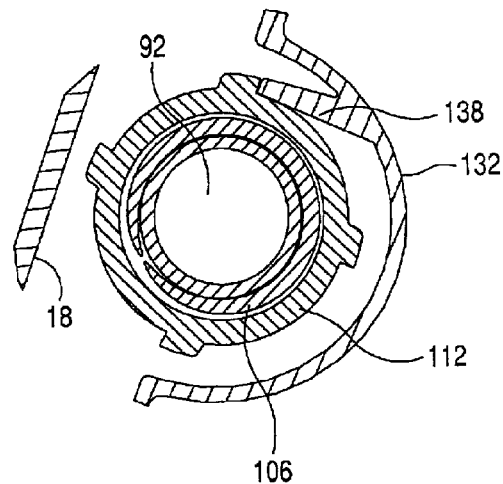
FIG. 8 is a sectional elevational view of a portion of the hinge mechanism of FIG. 5.

Next, first and second handles 132, having planar end portions 134, bearing tabs 135, C-shaped channels each including a pawl 138 and planar connecting portions 140 are attached to lever support bosses 50 with suitable fasteners 142. Resilient grommets 143 are provided between fasteners 142 and connecting portions 140 to facilitate a bearing that allows the handle 132 to move forward and backward, and to help return the handles to their rest positions after they are operated and then released. During the attachment process, care must be taken to align each one of the pawls 138 with one of the projections 118 on one of the lock sleeves 112, as shown in FIG. 8, so that the movement of one of the levers will rotate sleeve 112 by a few degrees in an uncoiling direction to slightly uncoil the lock spring. One of pawls 138 is mounted so that it will overlie a first side of the first lock spring sleeve 112, the top side, for example, while the other is arranged so that it will engage against the opposite side of the other lock spring sleeve, the bottom for example. In this manner, a pull on one of the levers will rotate the first lock spring sleeve in a first direction while a pull on the other lever in the same direction will rotate the other lock spring sleeve in the opposite direction. Because the springs are mounted with their free ends facing outwardly along the rod, the uncoiling directions of the springs are opposite.

Slide bearings 124 including bearing slots 126 are mounted onto support bearings 122, which are then connected to inner side 18 via the bosses 46. When properly aligned, the slide bearings secure the hinge 92 in its proper location, and bearing tabs 135 will fit within bearing slots 126 so that handles 132 move linearly toward and away from the front leg of the stand when they are pulled.

Figure 10:
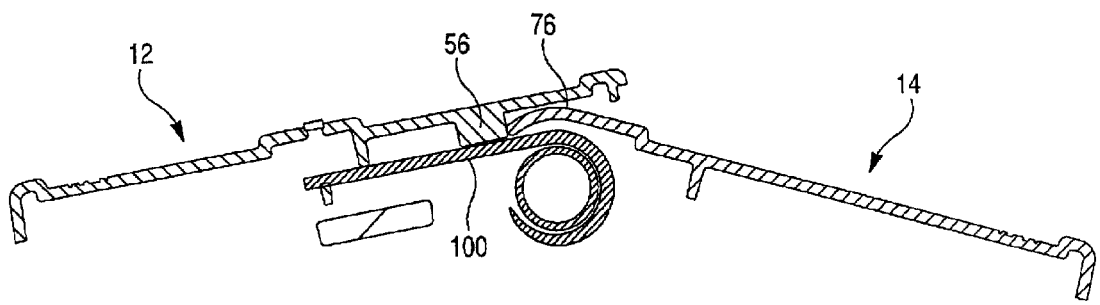
FIG. 10 is a sectional side elevational view of the stand of FIG. 1 positioned for supporting a display in a second orientation.

To attach the leg 14, the rear legs 102 of the balance springs 100 are threaded into the balance spring openings 86, the C-shaped surfaces 78 and 82 are rested against hinge 92 such that the protrusion 89 aligns with the middle hole in 92, and then the leg is turned to the "open" position of the stand (against the action of the balance springs, see FIG. 10). In this position, appropriate fasteners 120 can be inserted through the bores in hinge 92 and fastened into the bosses 88 of leg 14.

One end of each lock spring 106 is attached to the front leg 12 of the stand and, because rod 92 is attached to rear leg 14, moving the rear leg rotates the rod within the lock springs 106. However, due to the close fit between rod 92 and lock spring 106, rotating the rod will tend to either coil or uncoil the springs on the rod, depending on the orientation of the springs. Because the springs are oppositely mounted, rotating the rod will tend to coil one of the springs and uncoil the other. When the rod rotates even slightly in the coiling direction, one of the springs coils more tightly around the rod and prevents further movement of the rod within the spring. When the rod moves in the other direction, the spring is slightly uncoiled by the rotating rod and does not interfere with rod movement. Because the two lock springs are oppositely mounted, substantially all movement of the rod within the springs, and therefore substantially all movement between the front leg and the rear leg, is prevented. However, the handles or levers 132 are provided to selectively rotate the spring sleeves in the uncoiling direction of each spring. Therefore, to move the stand legs apart, one lever is pressed to uncoil the lock spring that resists movement in the opening direction. While held in this released position, the stand legs can be moved apart, but not moved toward one another. The presence of the balancing springs provide some resistance to such opening movement and prevent the legs from falling immediately to the fully open position under the weight of the stand and any display supported thereon. When the rear leg reaches its desired position, the lever is released to lock the legs in position. The other lever is used to release the second lock spring when a user desires to decrease the spacing between the legs.

Figure 9:
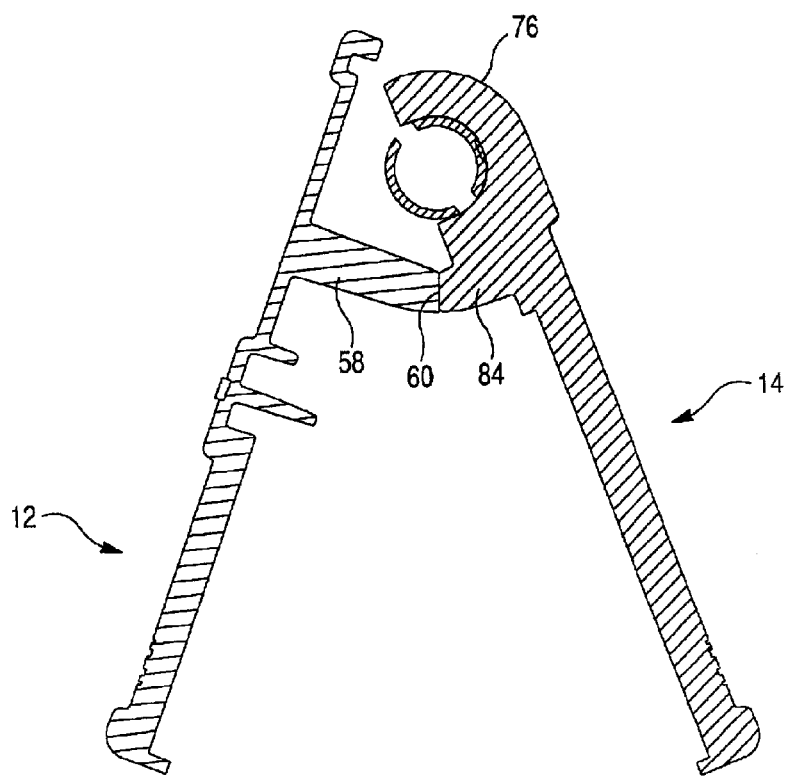
FIG. 9 is a sectional side elevational view of the stand of FIG. 1 positioned for supporting a display in a first orientation.

FIG. 9 shows stand 10 with legs 12 and 14 angled at an acute angle of about 45 degrees. As will be appreciated from this figure, in this position, closing limiting stop 58 on the inner surface of front leg 12 engages against projection 84 on the inner face of rear leg 14 to prevent the angle between the legs from becoming any smaller. Of course, if desired, the lengths of closing limiting stop and projection 84 could be adjusted to provide for greater or lesser angles between the legs.

FIG. 10 shows legs 12 and 14 in a fully open position at an obtuse angle of about 140 degrees. In this position, the first and second notches of rear leg 14 engage open limiting stop 56 on the rear of front leg 12 to prevent the stand from being opened to a greater angle. Of course, the size and/or placement of the open limiting stop could be varied if a greater or lesser maximum opening angle is desired.

Figure 11:
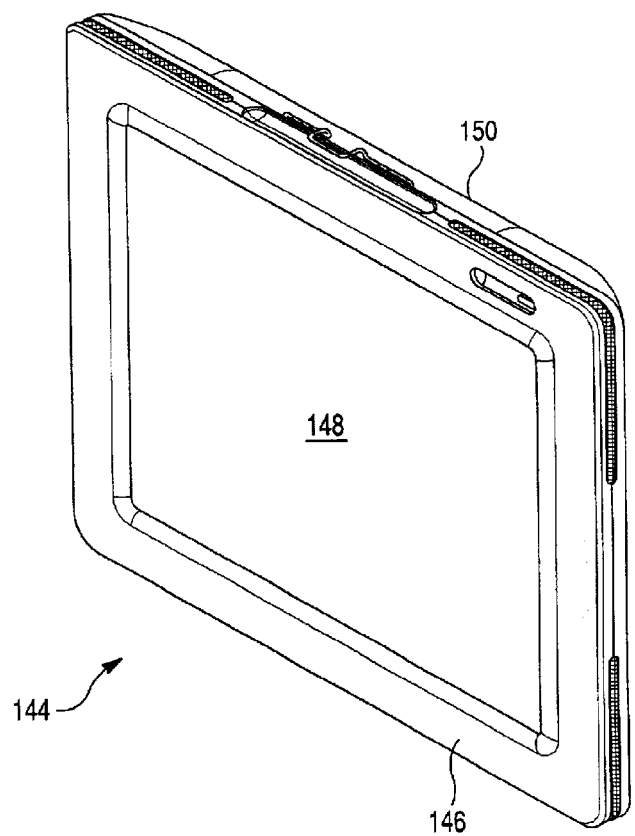
FIG. 11 is a front perspective view of a display usable with the stand of FIG. 1.

FIGS. 11–13 show the display 144 used with stand 10 which display includes a housing 146, a screen 148 on the front of the housing, and a housing rear 150 having a centrally located depression 152 whereat a boss 154 is attached to the housing to allow the housing to be used with stand 10. Boss 154 comprises a first element 156 that includes a notch 158 for retaining a projecting stop 160 and a second element 162 that, when attached to depression 152 adjacent first element 156 forms boss 154 with a flange 164, first and second curved end walls 166 and first and second generally parallel sidewalls 168. A strain relief element 170, which is normally part of the cord attached to the display, passes through the opening between the boss elements. To attach the boss to the housing, parts 156 and 162 are aligned with each other such that they close around the strain relief, stop 160 is placed into the proper position, and then the combined 156 and 162 are pressed into the depression 152 and secured with screws.

Figure 15:
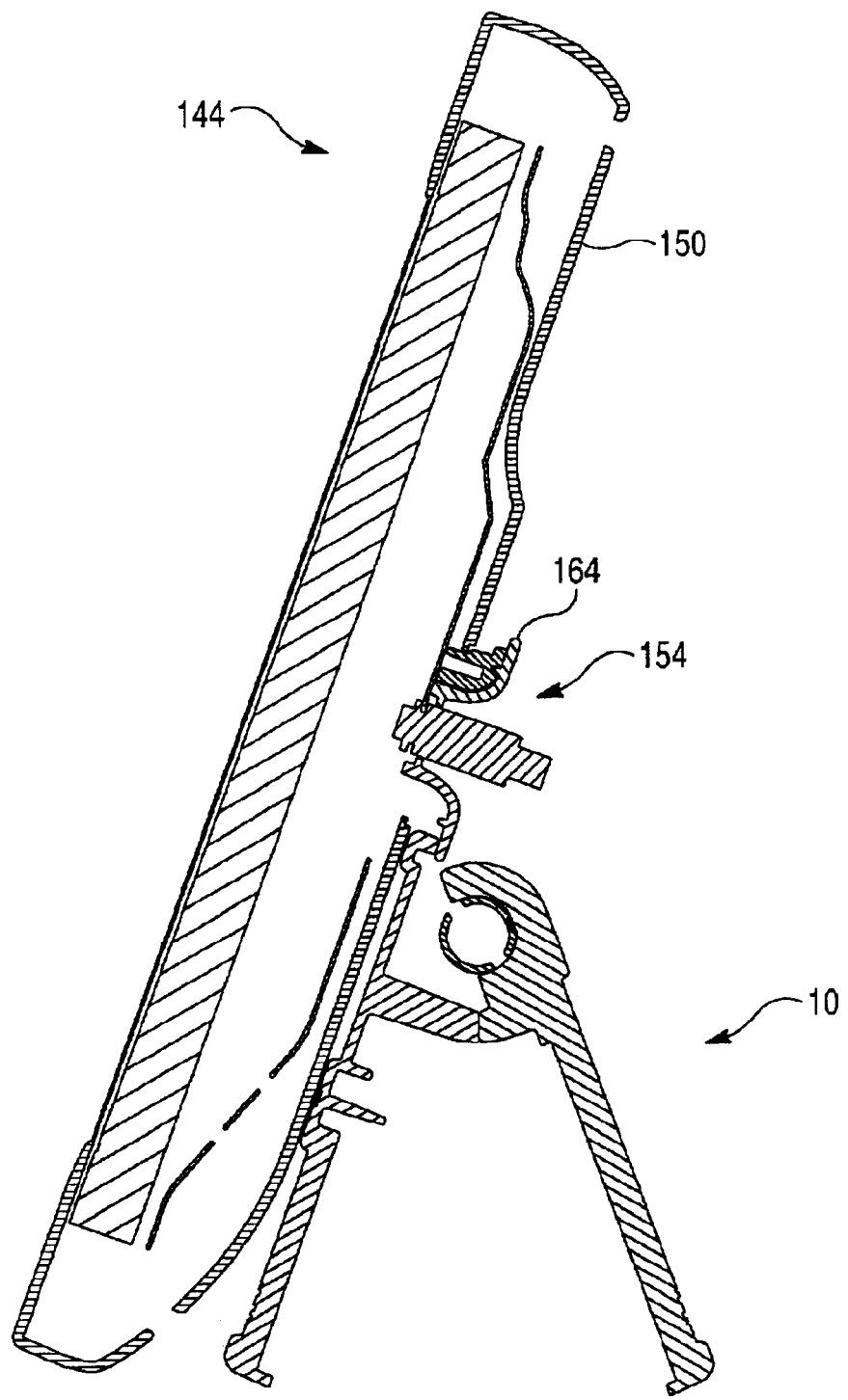
FIG. 15 is a sectional side elevational view of the display of FIG. 11 mounted in the stand of FIG. 1.

In use, display 144 is placed into stand 10 by aligning boss 154 with channel 28 and lowering the boss into the channel as shown in FIG. 15. Linear peripheral wall portions 26 guide boss 154 into proper position allowing a user to mount the display on the stand without looking behind the display at the boss. The width of channel 28 is greater than the spacing between the straight side walls of boss 154, and thus the boss fits easily within the channel in this orientation. Importantly, the display is placed in the channel with stop 160 facing upwardly, away from the bottom of the channel. Flange 164 prevents boss 154 from being pulled out of channel 28 in a direction normal to screen 128. And, because the separation between the curved ends 166 of the boss is greater than the width of the top opening into channel 28, the boss is locked in place when it is rotated from the landscape orientation. Stop 160 on boss 154 engages stop 39 in channel 28 when the display has been rotated approximately 180 degrees in either direction. The display could be used without stop 39, but rotating the display by more than 180 degrees could tangle or damage a cord extending therefrom. The stop is not necessary if the stand is always used with a cordless display. The hard plastic material chosen for the boss 154 in combination with the hard metal bearing surface 40 allows for smooth sliding movement of the boss in the channel while felt layer 44 on the outer side 16 of the front leg also helps the rear of the display housing to slide smoothly over the outer side 16 of the stand as the display is rotated.

Figure 14:
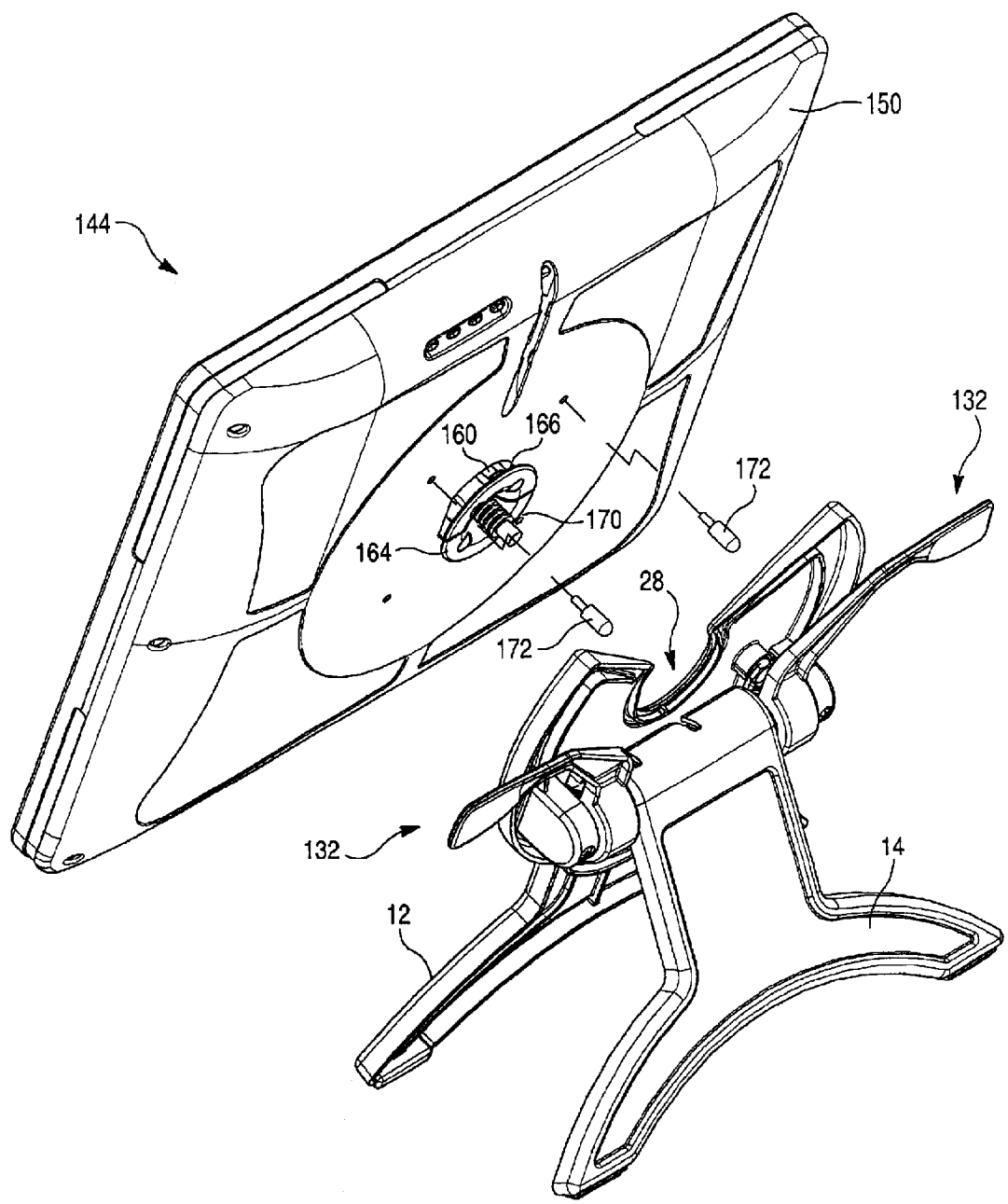
FIG. 14 is a rear perspective view of the display of FIG. 11 and the stand of FIG. 1.

FIG. 14 shows pegs 172 that can be placed in appropriate openings in the rear of housing 122 if a user desires to lock the display in either a portrait or landscape orientation. Once the display is in position, the user can change the orientation of the display by rotating it about the axis of boss 154 as necessary. The inclination of the display screen can be adjusted by manipulating levers 132 to release one or the other of lock springs 106 as discussed above and position the stand at either of the extreme positions show in FIGS. 9 or 10 or at any angular position therebetween. To remove the display from the stand, it is merely necessary to return the display to the landscape orientation and lift it from channel 28.

Figure 16:
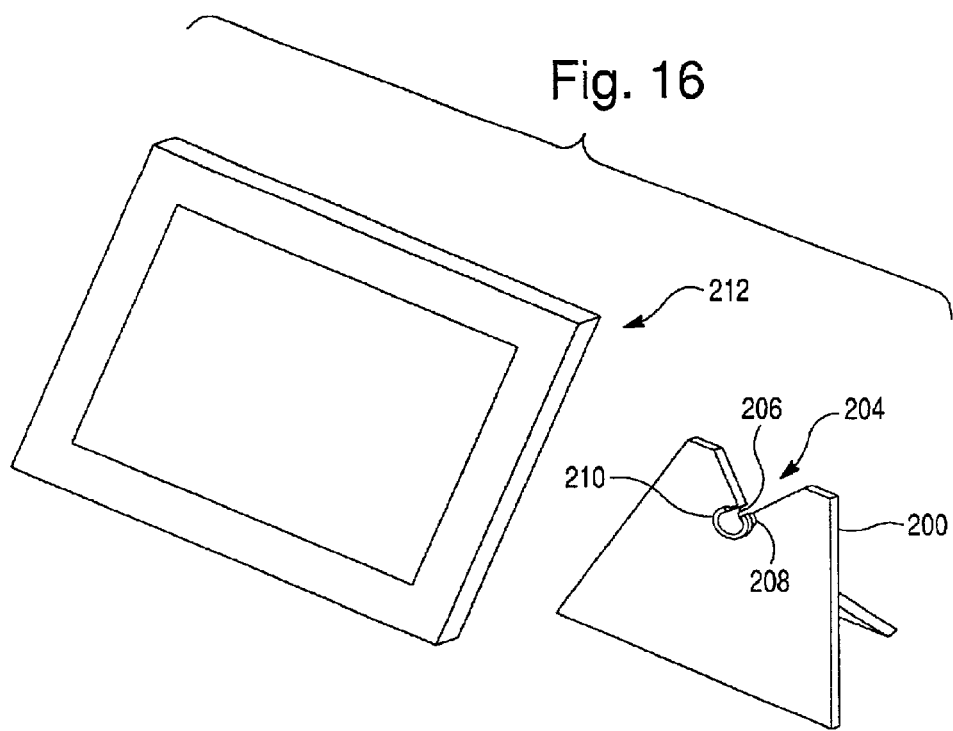
FIG. 16 is an exploded view of a display and support stand according to a second embodiment of the invention.
Figure 17:
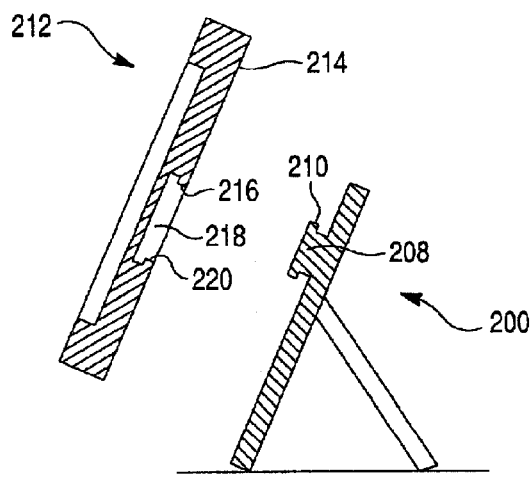
FIG. 17 is an exploded sectional side elevational view of the display and stand of FIG. 16.
Figure 18:
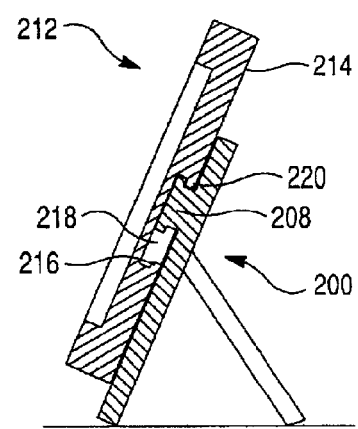
FIG. 18 is a section side elevational view of the display and stand of FIG. 16.

A second embodiment of the invention is shown in FIGS. 16–18. This embodiment uses the same lockable legs as the first embodiment but provide an alternate arrangement for rotatably attaching the display to the stand. Stand 200 of this embodiment comprises a planar front side that includes a notch 204 having bottom portion 206 comprising a segment of a circular arc. An arc-shaped wall 208 corresponding to the arc of portion 206 projects outwardly from portion 206 and terminates in a flange 210. While the front side is shown as having a shape generally like a section of a truncated cone, it could have other shapes, such as the C-shape of the front plate of the first embodiment, without departing from the scope of the invention, as long as an arc-shaped recess similar to that of the first or second embodiment is provided. Stand 200 is used with a display 212 that includes a rear wall 214 having an opening 216 which opens into a chamber 218 having a width greater than the width of opening 216. If the display is a corded display, a cord (not shown) will project outwardly from this opening. Alternately, chamber 218 could be viewed as including an inwardly projecting flange 220, which flange is the portion of rear wall 214 surrounding opening 216. To place display 212 on the stand, opening 216 is aligned with notch 204 and placed over the boss so that flange 206 of the boss is received in chamber 218 behind flange 220. Notch 204 allows a cord from the display to pass outwardly behind the stand.

In use, opening 216 of the display is positioned over arc shaped wall 208 and the flange 210 of the arc-shaped wall is placed into chamber 218 behind flange 220. The flange 210 engages behind flange 220 of chamber 218. The display maintains any orientation with respect to the stand through either a friction fit between the flange and chamber, or the friction between the front of the stand and the display housing (possibly using a felt pad as in the first embodiment). FIGS. 16–18 show a simplified stand arrangement comprising front wall 202 and a support leg. However, it should be understood that the mounting arrangement could just as easily be used on a support stand with two lockable legs as described in the first embodiment.

Figure 19:
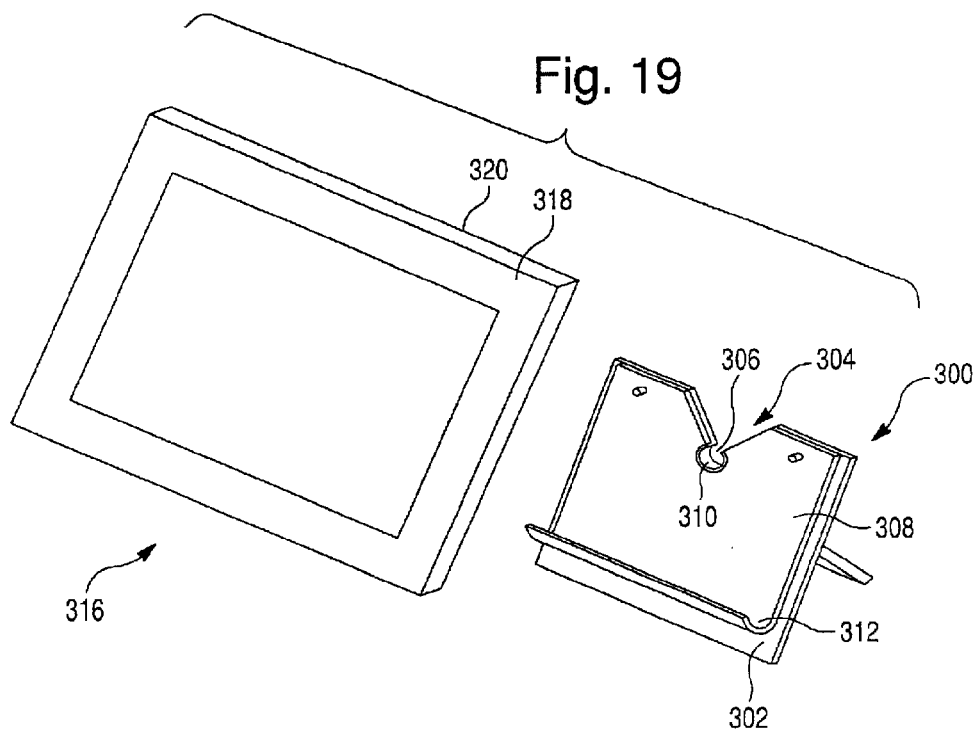
FIG. 19 is an exploded view of a display and support stand according to a third embodiment of the invention.
Figure 20:
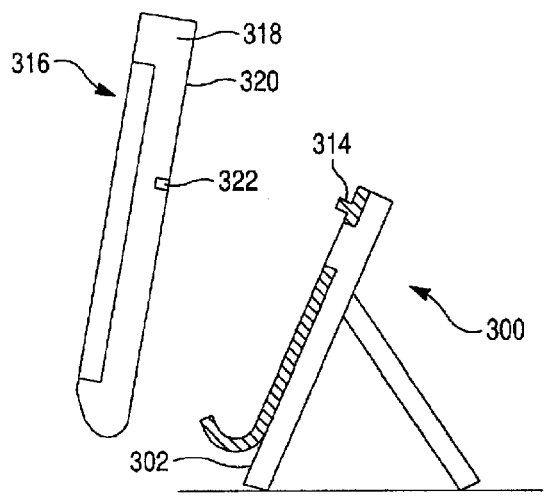
FIG. 20 is an exploded sectional side elevational view of the display and stand of FIG. 19.
Figure 21:
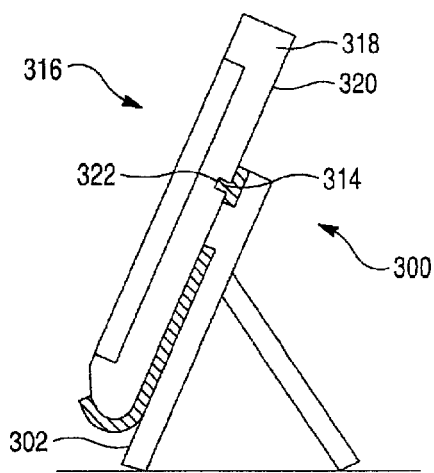
FIG. 21 is a section side elevational view of the display and stand of FIG. 19.
Figure 22:
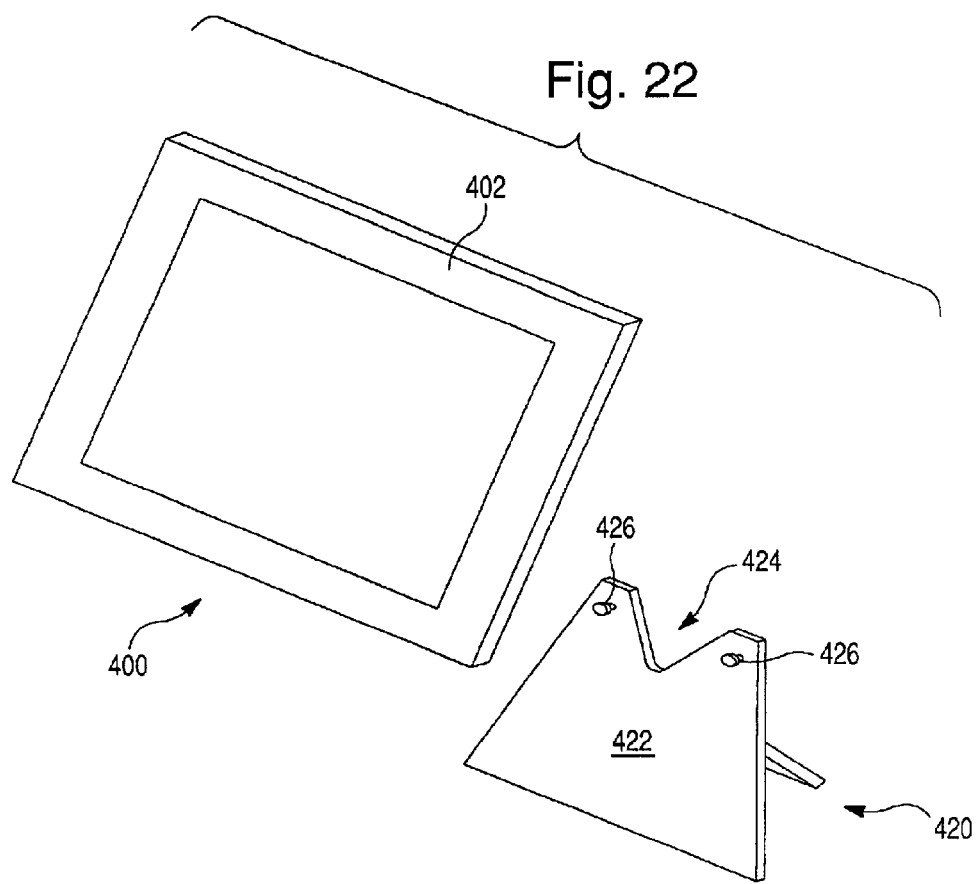
FIG. 22 is an exploded view of a display and support stand according to a fourth embodiment of the invention.
Figure 23:
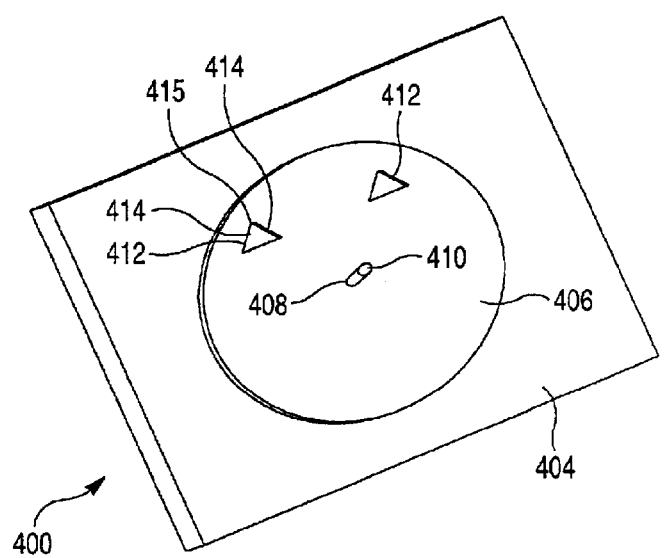
FIG. 23 is a rear perspective view of the display of FIG. 22 showing a support bearing on the housing.
Figure 25:
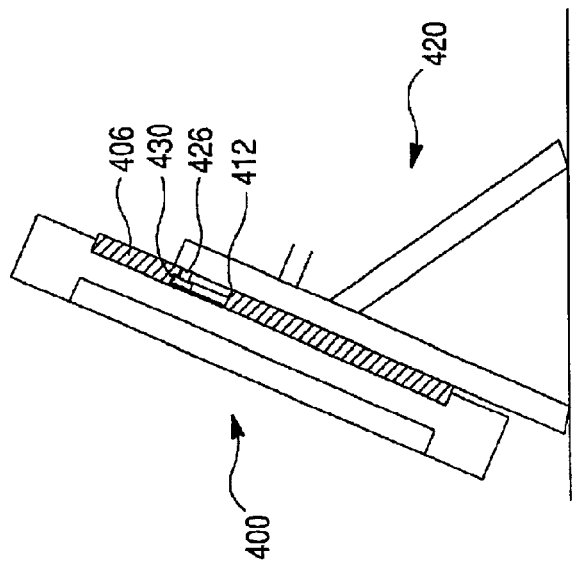
FIG. 25 is a section side elevational view of the display and stand of FIG. 22.

A third embodiment of the invention is shown in FIGS. 19–21. In this embodiment, a stand 300 comprises a planar front wall 302, having a notch 304 with an arc-shaped end portion 306. A cradle 308 having a C-shaped bearing member 310 projecting from one side thereof is attached to front wall 302 with bearing member 310 engaged in end portion 306 of the notch. Cradle 308 includes a hooked lower portion 312 and two pegs 314 projecting from the edge of the cradle opposite hooked lower portion 312. A display 316 is used with this stand which display includes a housing 318 having a rear wall 320 which includes first and second holes 322. In use, a lower end of display 316 is placed into hooked lower portion 312 of cradle 308 and leaned back against the cradle until pegs 314 enter holes 322. This arrangement keeps the display firmly mounted in the cradle while the cradle is rotated with respect to the stand. A friction fit between the cradle bearing member 310 and arc-shaped end portion 306 allow the cradle to be held in various orientations relative to the stand. The cradle can be held in various orientation relative to the stand by either a friction fit between the cradle bearing member 310 and arc-shaped end portion 306, or by a friction device (e.g. felt pad) between the front of the stand platform 302 and the back of the rotating cradle 308, or similar means. Notch 304 allows the stand to be used with a corded display. While a simplified support structure for the stand is shown in these figures, the cradle and mounting arrangement could also easily be used with an adjustable stand such as the one described above in the first embodiment.

Figure 24:
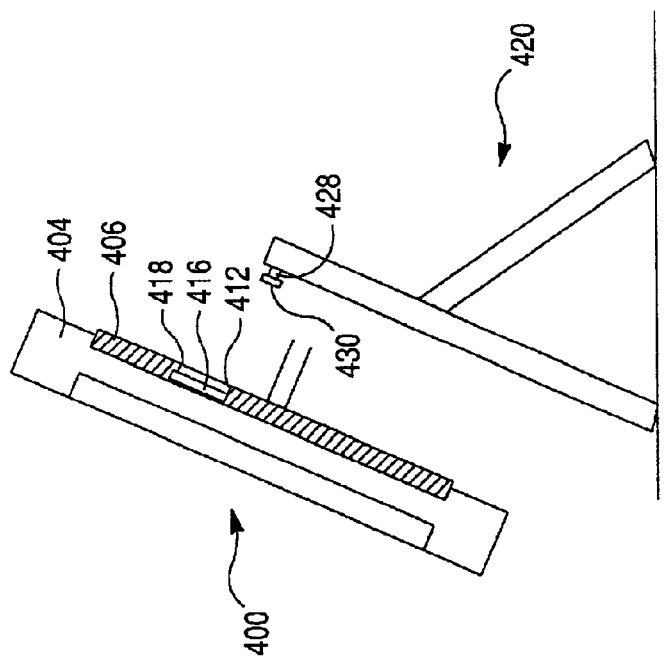
FIG. 24 is an exploded sectional side elevational view of the display and stand of FIG. 22.

A fourth embodiment of the invention is shown in FIGS. 22–25 wherein a display 400 including a housing 402 having a rear surface 404 is provided with a rotatable bearing 406 on rear surface 404. Bearing 406 is centrally located on housing rear and includes a central opening 408 to accommodate a cable 410 emerging from the display so that bearing 406 can rotate around the cable without twisting or damaging the cable. Bearing 406 further includes two openings 412 which each of which preferably includes a pair of converging wall portions 414 meeting at a vertex 415. As best seen in FIG. 24, openings 412 each open into an interior chamber 416 that is wider than opening 412 thus forming a lip or flange 418 around each opening.

Display 400 is used with a stand 420 comprising a planar front side 422 having a V-shaped notch 424 and first and second projections 426 located one on either side of notch 424. Each projection includes a rod portion 428 and an end flange 430, and these projections are securely fastened to or integrally formed with the stand. The planar front side can be supported in any manner, for example, using a fixed leg or using the adjustable legs described above in the first embodiment.

In use, the display is mounted on the stand by aligning openings 412 with projections 426 and inserting projections 426 into openings 412. The openings are larger than end flanges 430 so small errors in alignment are tolerated. Converging wall portions 414 direct the projections toward vertex 415 where they are securely supported. Flanges 430 on the projections are received in chamber 416 behind lip 418 of the display and preventing the projections from being pulled out of the openings in a direction normal to the housing rear. Supported in this manner, bearing 406 remains essentially fixed with respect to stand 420 while the housing 402 rotates with respect to bearing 406. Bearing 406 may include a locking mechanism for holding the display in a desired orientation with respect to the stand or a friction fit between the bearing and the housing may allow the display to stay in a given orientation relative to the bearing until a sufficient force is applied to change the relative orientations.

The present invention has been described in terms of several preferred embodiments, it being understood that changes and additions to these embodiments will become apparent to those skilled in the art upon a reading of the foregoing description. For example, while the stand of the present invention has been described as having legs positioned such that each has a free terminal end that engages against a surface to support a display, legs could also be used in other orientations, such as with one lying flat on a surface with the other projecting away from the surface without departing from the scope of the invention. And, while a stand with two legs has been described, the stand could just as easily have three or more legs if this were desirable for reasons such as the nature of the environment in which the stand is to be used. It is intended that all such obvious modifications and additions form a part of this invention to the extent that they are included within the scope of the several claims appended hereto.

What is claimed is:

1. In combination, a display and a support stand for adjustably supporting said display, said display comprising a housing having a front and a rear, a screen mounted on said housing front and a boss projecting from said housing rear; and said stand having a bearing surface for receiving said boss and rotatably supporting said display, said stand comprises first and second legs connected by a hinge and said hinge comprises at least one spring clutch, said stand having a channel with a first end that is open and a second end that is closed, said boss being slidingly removable from said channel open.

2. The combination of claim 1 wherein said boss is detachably secured to said housing.

3. The combination of claim 1 wherein said boss includes a centerline normal to said display and a generally circular cross section normal to said centerline.

4. The combination of claim 3 wherein said boss includes a first end adjacent said housing and a second end spaced from said housing, said second end including a flange.

5. The combination of claim 1 wherein said bearing surface comprises an arc of a circle.

6. The combination of claim 5 wherein said arc is greater than 180 degrees.

7. The combination of claim 4 wherein said stand comprises a plate member having a thickness, said bearing surface is located in said plate member, and said flange is spaced from said housing by a distance substantially equal to said plate thickness.

8. The combination of claim 6 wherein said circular arc has first and second ends spaced apart by a first distance and said boss has a minor axis shorter than said first distance and a major axis longer than said first distance.

9. The combination of claim 7 wherein said bearing surface has first and second ends and said plate member includes first and second walls extending from said first and second ends.

10. The combination of claim 1 wherein said boss is centrally located on the housing rear.

11. The combination of claim 1 wherein said housing is rotatable on said stand between a portrait orientation and a landscape orientation.

12. The combination of claim 1 including a stop for limiting the rotation of said display with respect to said stand.

13. The combination of claim 11 including at least one stop for selectively holding said housing in either said portrait or said landscape orientation.

14. The combination of claim 1 wherein said hinge is selectively lockable in at least two positions.

15. The combination of claim 1 wherein said hinge comprises a balance spring.

16. The combination of claim 15 wherein said first leg lies generally in a first plane, said second leg lies generally in a second plane and wherein said hinge is shiftable between a first position wherein said first leg and said second leg meet at an obtuse angle and a second position wherein said first leg and said second leg meet at an acute angle.

17. The combination of claim 16 wherein said obtuse angle is between about 140 degrees and 180 degrees and said acute angle is between about 20 degrees and 60 degrees.

18. The combination of claim 1 including at least one lever for shifting said at least one spring clutch between an engaged position and a disengaged position.

19. The combination of claim 18 wherein said at least one spring clutch comprises first and second oppositely mounted spring clutches.

20. The combination of claim 1 wherein a portion of said first leg is covered with a high friction material and wherein a portion of said second leg is covered with a low friction material.

21. The combination of claim 1 wherein said hinge is lockable to prevent an angle between said first and second legs from increasing.

22. The combination of claim 1 wherein said hinge is lockable to prevent the angle between said first and second legs from decreasing.

23. The combination of claim 1 wherein said hinge includes a first lock for preventing the angle between said first and second legs from increasing, a second lock for preventing the angle between said first and second legs from decreasing, and at least one actuator for releasing said first or said second lock.

24. The combination of claim 1 wherein said boss has a T-shaped cross section.

25. In combination, a display and a support stand for adjustably supporting said display, said display comprising a housing having a front and a rear, a screen mounted on said housing front and a boss projecting from said housing rear; and said stand having a bearing surface for receiving said boss and rotatably supporting said display, said stand having a channel with a first end that is open and a second end that is closed, said boss being slidingly removable from said channel open end, said channel is substantially circular, said channel subtends an arc in excess of 180°, said first open end has spaced first and second opposed terminal ends and a linear peripheral portion extends adjacently outwardly from each of said terminal ends.

26. The combination of claim 25, wherein said channel has a first width at said open end, a second width at a longitudinal midpoint, and a third width adjacent said channel closed end, said first width being narrower than said second width, said second width being greater than said first and third widths.

27. The combination of claim 25, wherein said channel is substantially vertical when said stand vertically supports said display, said channel closed end having a vertically lower position than said channel open end.

28. The combination of claim 25, wherein said channel width is narrower than said boss width.

29. The combination of claim 25, wherein said channel centerline coincides with said stand centerline.

* * * * *